(12) United States Patent
Ogasawara

(10) Patent No.: US 7,110,343 B2
(45) Date of Patent: Sep. 19, 2006

(54) SPHERICAL ABERRATION CORRECTION APPARATUS

(75) Inventor: Masakazu Ogasawara, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 579 days.

(21) Appl. No.: 10/655,473

(22) Filed: Sep. 4, 2003

(65) Prior Publication Data
US 2004/0100879 A1 May 27, 2004

(30) Foreign Application Priority Data
Sep. 5, 2002 (JP) .............................. 2002-260119

(51) Int. Cl.
*G11B 7/00* (2006.01)

(52) U.S. Cl. ................................. 369/112.02
(58) Field of Classification Search ........... 369/112.01, 369/112.1, 112.02, 44.24, 44.25
See application file for complete search history.

(56) References Cited

U.S. PATENT DOCUMENTS
6,532,202 B1 * 3/2003 Wada et al. ............ 369/112.02

FOREIGN PATENT DOCUMENTS
JP 10-106012 4/1998
JP 10-269911 10/1998

* cited by examiner

*Primary Examiner*—Nabil Hindi
(74) *Attorney, Agent, or Firm*—Perman & Green, LLP

(57) ABSTRACT

An aberration correction apparatus includes a first aberration correction element having aberration correction portions, a second aberration correction element which causes the wave front of the transmitted light beam to have a blaze hologram shape, a discriminator which discriminates the aberration of the reflected light beam, a coarse phase adjuster which drives the second aberration correction element on the basis of the magnitude of the aberration of the reflected light beam, and a fine phase adjuster which corrects aberration remained after the aberration correction by the coarse phase adjuster.

6 Claims, 13 Drawing Sheets

SPHERICAL ABERRATION CORRECTION APPARATUS

BACKGROUND OF THE INVENTION

1. Field of the Invention

The present invention relates to a spherical aberration correction apparatus for correcting aberration of a light beam.

2. Description of the Related Art

As a data recording medium wherein data recording or data reproduction is performed optically, an optical disc such as CD (Compact Disc) or DVD (Digital Video Disc or Digital Versatile Disc) is known. Various kinds of optical discs have been developed including a read-only optical disc, a write-once optical disc on which data can be recorded additionally, and a rewritable optical disc in which data erasing and rewriting can be performed. Furthermore, a multi-layer optical disclaimed to increase capacity of the optical disc is known, in which recording capacity for one side of the recording disc can be increased by providing multiple recording layers on a same recording side. Such multi-layer optical disc has a structure such that the multiple recording layers are stacked with a comparatively short, predetermined distance between two layers. For example, a recordable multi-layer optical disc using a recording medium such as a phase-change medium has been developed.

According to such improvement of recording density of the optical disc, research and development have been pursued on an optical pickup device and a data recording/reproduction device. Further, research and development have been made on an optical pickup device and a data recording/reproduction device that have compatibility for different types of optical discs.

In such an optical pickup device, a light beam such as laser light is irradiated on the optical disc during the recording or reproduction. It is important to correct or compensate aberration generated by reflection of a light beam reflected from the optical disc. The aberration changes during the recording or reproduction of the optical disc, since thickness of a cover layer of the optical disc generally has an in-plane distribution. In particular, the thickness of the cover layer from a disc surface to the recording layer (and thickness of a spacer layer) varies for each recording layer in the optical disc having the multiple recording layers on a same side of the disc. Therefore, the aberration changes when a reading position or recording position is changed from one recording layer to other recording layer. Further, a distribution of the aberration in a plane perpendicular to a light axis is changed as well as magnitude of the aberration.

As a conventional aberration correction apparatus for correcting such aberration, there is an apparatus using a beam expander which changes a beam diameter of the light beam, for example, an apparatus disclosed in Japanese Patent Application Kokai No.H10-106012. The aberration correction apparatus moves the beam expander along the light axis of the light beam, thereby correcting the aberration of the light beam caused by the optical disc. However, the apparatus has drawbacks that the beam expander causes an increased size of an optical system. In addition, a mechanism for driving a lens is necessary, which leads to a complicated structure.

As another method for reducing the effect of the aberration, conventionally, a pickup device having a liquid crystal element for correcting the aberration is proposed. For example, such a devise is disclosed in Japanese Patent Application Kokai No.H10-269911. The aberration correction element, having multiple phase adjusting portions formed concentrically, applies a predetermined voltage to each electrode, thereby adjusts an orientation state in the liquid crystal, and thus corrects the aberration generated by reflection of the light beam. However, in the aberration correction element having such configuration, thickness of the liquid crystal must be increased to correct a large aberration such as an aberration exceeding the wavelength of source light. In particular, in a case of use in the multi-layer disc, the thickness of the liquid crystal must be extremely increased, and a large applied voltage is required. Therefore, in addition to difficulty in fabrication, there has been a drawback of an extremely long response time required for a predetermined focal distance after application of voltage. This is because the response time is inversely proportional to the square root of the thickness of the liquid crystal layer. Therefore, there has been a problem that improvement of performance of the aberration correction device such as miniaturization, decrease of thickness, and speeding up is obstructed. Also, there is a problem that the increase of the thickness of the liquid crystal causes lowering of frequency response of the aberration correction device.

SUMMARY OF THE INVENTION

The present invention has been made in view of the foregoing problems, and the problems that the invention intends to solve include the above problem as an example. It is an object of the present invention to provide a high-performance aberration correction apparatus which can extensively correct the aberration of the light beam. Moreover, It is another object of the present invention to provide a high-performance aberration correction apparatus which is capable of correcting the aberration caused by the multi-layer disc, and usable also for a single-layer disc.

To achieve the object, according to one aspect of the present invention, there is provided an aberration correction apparatus for correcting aberration generated by reflection of a light beam reflected from a recording layer of a recording medium which is irradiated with the light beam, which comprises a first aberration correction element having a plurality of aberration correction portions and causing a phase change in a transmitting light beam upon application of voltage, a second aberration correction element which causes a phase change in a transmitting light beam such that the wave front of the transmitted light beam has a blaze hologram shape, a discriminator which receives the reflected light beam to discriminate the aberration of the reflected light beam, a coarse phase adjuster which drives the second aberration correction element on the basis of the magnitude of the aberration of the reflected light beam to perform an aberration correction, and a fine phase adjuster which adjusts the applied voltage to the aberration correction portions of the first aberration correction element to correct aberration remained after the aberration correction by the coarse phase adjuster.

According to another aspect of the present invention, there is provided an aberration correction apparatus for correcting aberration generated by reflection of a light beam reflected from a recording layer of a recording medium which is irradiated with the light beam, comprises a first aberration correction element having a plurality of aberration correction portions and causing a phase change in a transmitting light beam upon application of voltage, a second aberration correction element including at least one lens, an actuator which drives the second aberration correction element, a discriminator which receives the reflected light beam to discriminate the aberration of the reflected light beam, a coarse phase adjuster which selects one of the at least one lens on the basis of the magnitude of the aberration of the reflected light beam, and drives the actuator to move the selected lens on a light axis of the reflected light beam to perform aberration correction, and a fine phase adjuster which adjusts the applied voltage to the aberration correction portions of the first aberration correction element to correct aberration remained after the aberration correction by the coarse phase adjuster.

DETAILED DESCRIPTION OF THE INVENTION

Figure 1:
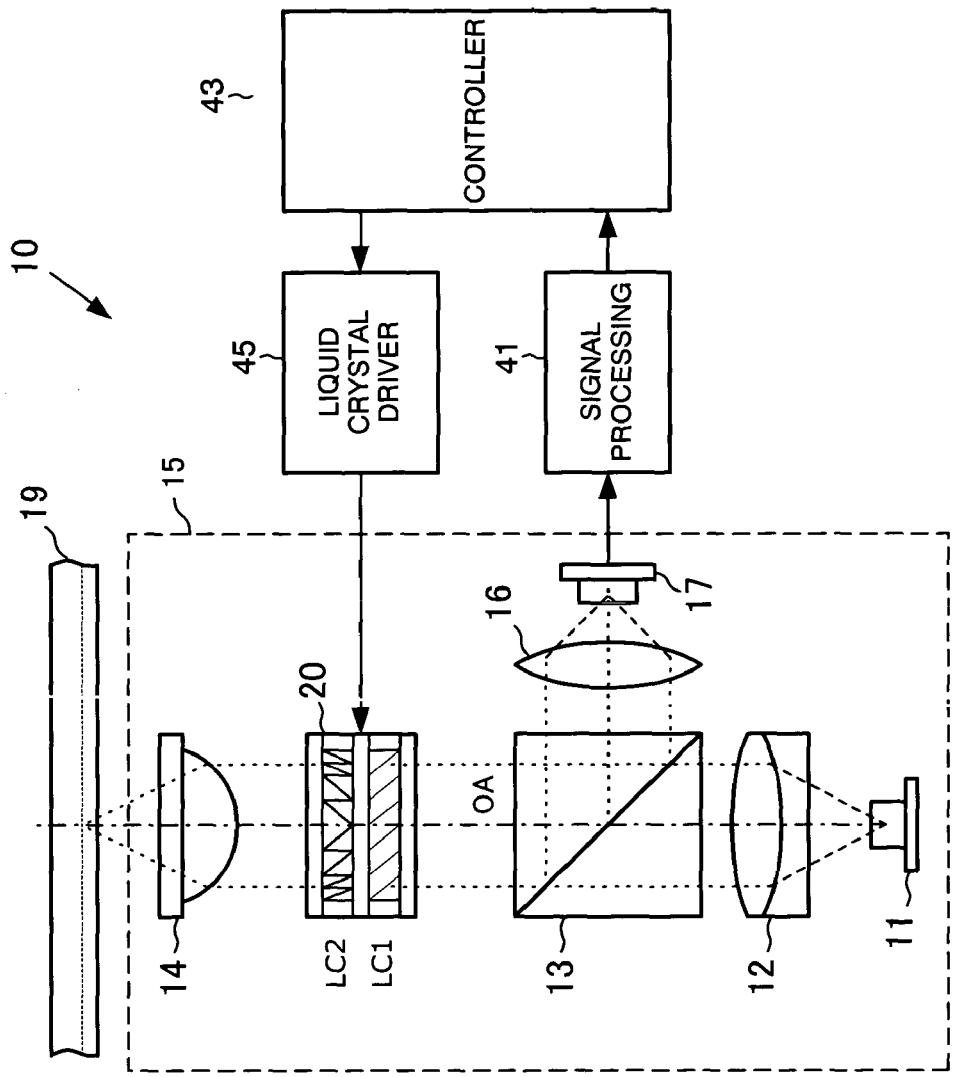
FIG. 1 is a block diagram showing a configuration of an aberration correction apparatus according to a first embodiment of the present invention.

Embodiments of the invention are described in detail with reference to drawings. In the drawings described below, substantially equivalent portions are marked with equal reference numerals.

First Embodiment

FIG. 1 is a block diagram showing a configuration of an aberration correction apparatus 10 according to a first embodiment of the present invention.

There is provided a laser light source 11 emitting a laser light having a predetermined wavelength in an optical pickup device 15. The laser light source 11 emits a laser light, for example, having a wavelength $\lambda$ of 405 nanometers (nm). The light beam emitted from the laser light source 11 is made into a parallel light beam by a collimator lens 12. The light beam is incident on an optical disc 19 by way of a beam splitter 13, an aberration correction unit 20, and an object lens 14. The incident light beam is reflected by the optical disc 19. The reflected light is reflected by the beam splitter 13 after passing through the object lens 14 and the aberration correction unit 20, and condensed by a condensing lens 16 to be detected by an optical detector 17.

Figure 2:
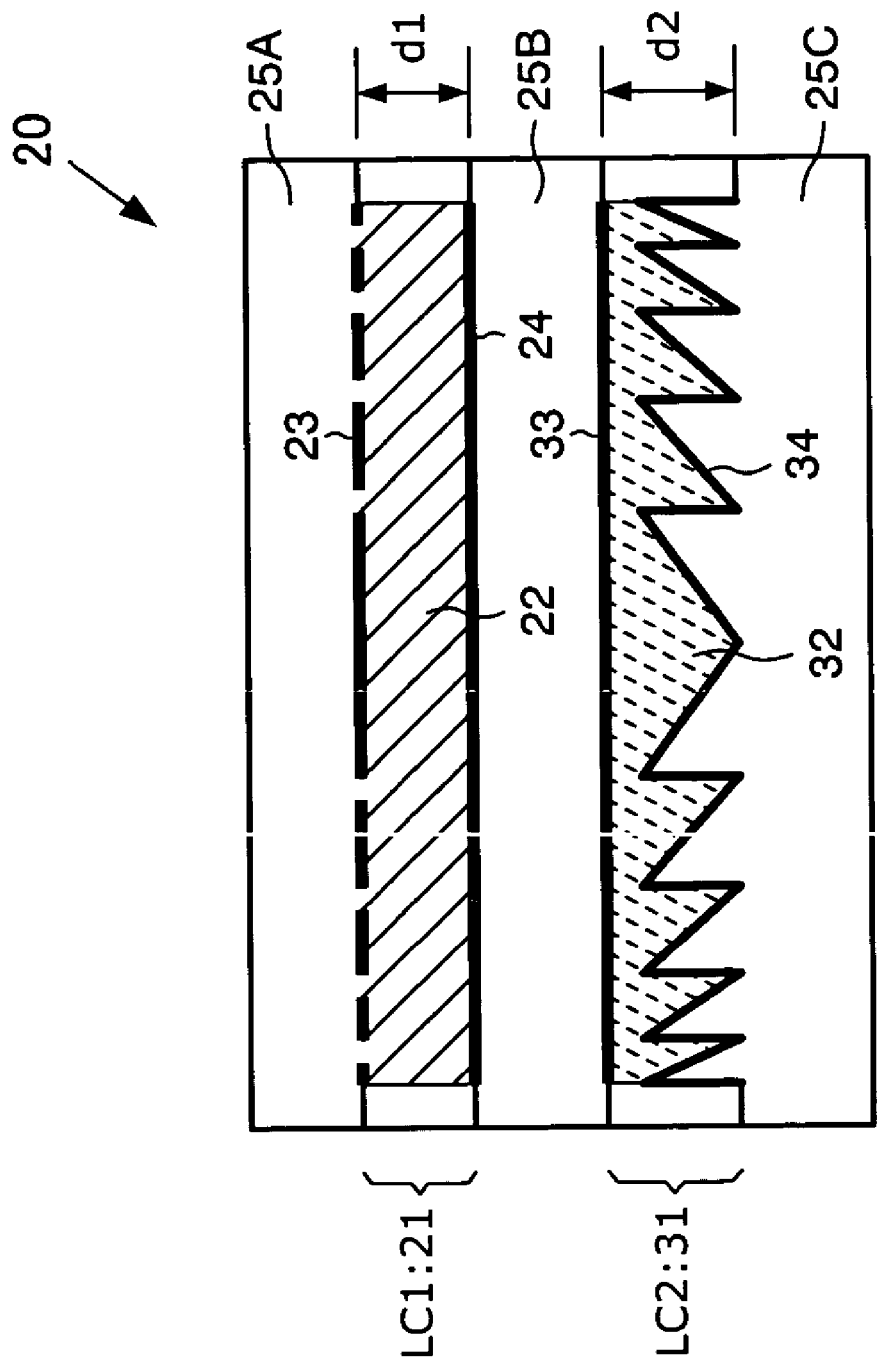
FIG. 2 is a cross sectional view showing a configuration of an aberration correction unit having a segment liquid crystal cell and a hologram liquid crystal cell.

The aberration correction unit 20 will be described in detail with reference to the drawings. FIG. 2 is a cross sectional view showing a configuration of the aberration correction unit 20. The aberration correction unit 20 comprises a glass substrate 25A, a segment liquid crystal cell 21 as a first liquid crystal cell (LC1), a glass substrate 25B, a hologram liquid crystal cell 31 as a second liquid crystal cell (LC2), and a grass substrate 25C.

More specifically, the segment liquid crystal cell 21 (LC1) comprises electrodes 23, 24, and a liquid crystal 22 encapsulated between the electrodes. There are formed an orientation film for the liquid crystal and a transparent insulating layer (not shown) between the electrode 23 and the liquid crystal 22 and between the electrode 24 and the liquid crystal 22.

At least one of the electrodes 23, 24 comprises multiple, transparent segment electrodes having a concentric (or circular) shape. The aberration of the light beam transmitted through the segment liquid crystal cell 21 can be corrected by applying voltage to each of the multiple segment electrodes according to a distribution shape or pattern of the aberration generated by reflection of the light beam. Hereinafter, a case where the electrode 23 has multiple segment electrodes is described as an example.

Figure 3:
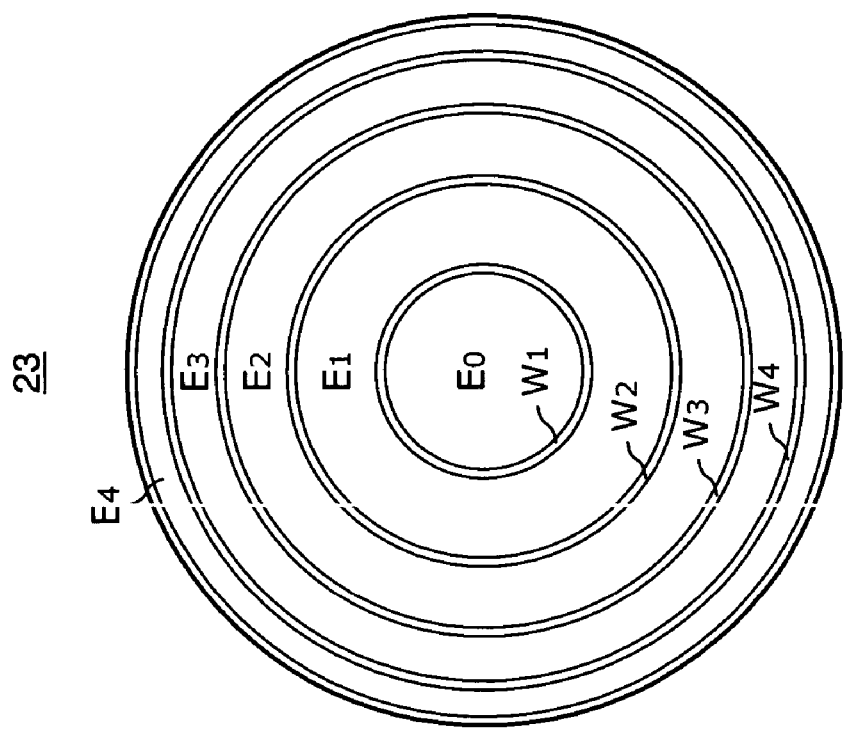
FIG. 3 is a plan view schematically showing a structure of segment electrodes of the segment liquid crystal cell for correcting a spherical aberration.

FIG. 3 is a plan view schematically showing a structure of the electrode 23 of the segment liquid crystal cell 21 for correcting the spherical aberration. The electrode 23 of the segment liquid crystal cell 21 comprises, for example, five transparent segment electrodes Ei (or E0, E1, E2, E3, E4) having a concentric or circular shape corresponding to the distribution of the spherical aberration caused by the optical disc 19. Each of the segment electrodes E1 is divided or separated by gaps Wi (i=1, 2, . . . , 4) and electrically isolated. The transparent electrode 24 is formed over an entire surface of the liquid crystal 22. The transparent electrode is formed from, for example, indium-tin oxide (ITO).

When control voltage Vi (i=1, 2, . . . , 4) is applied between each of the segment electrodes Ei and the electrode 24, orientation of liquid crystal molecules in respective portions in the liquid crystal 22 is changed according to an electric field generated by the control voltage Vi. As a result, phase of the light transmitting through the liquid crystal 22 is changed due to birefringence of the liquid crystal 22. Each area of the liquid crystal 22 corresponding to each of the segment electrodes Ei forms an aberration correction portion. That is, the phase of the transmitting light can be controlled by the control voltage Vi applied to the liquid crystal 22.

The hologram liquid crystal cell 31 (LC2) is encapsulated between the glass substrate 25B and the glass substrate 25C having a sawtooth cross-sectional profile, and formed as a liquid crystal Flesnel lens having liquid crystal 32 with a blaze hologram pattern where a diffraction grating has a sawtooth cross-sectional profile, and transparent electrodes 33, 34 arranged on both sides of the liquid crystal 32 such that voltage can be applied to the liquid crystal 32. The electrodes 33, 34 are formed from an undivided, uniform, transparent and conductive material. The substrates 25A, 25B, and 25C may be formed from, not limited to the glass, any transparent material such as resin.

The segment liquid crystal cell 21 and the hologram liquid crystal cell 31 are arranged such that their light axes are co-axial.

The segment liquid crystal cell 21 and the hologram liquid crystal cell 31 have thickness d1 and d2 respectively, and voltage can be applied to each of the segment liquid crystal cell 21 and the hologram liquid crystal cell 31 independently.

In FIG. 1, although the aberration correction unit 20 is shown such that the hologram liquid crystal cell 31 is located at a side near to the object lens 14, the segment liquid crystal cell 21 can be arranged so as to be located at the side near to the object lens 14.

In this embodiment, the hologram liquid crystal cell 31 (LC2) is suitable for correction of the aberration corresponding to a distance between recording layers of the multi-layer disc, or the coarse adjustment of the aberration, since the hologram cell 31 is capable of correcting a large aberration but is capable of correcting only a certain extent of aberration defined by difference in level of the blaze hologram pattern On the other hand, the segment liquid crystal cell 21 (LC1) performs a best-image-plane type aberration correction where a divided pattern of the liquid crystal cell corresponds to distribution of the spherical aberration in the best-image-plane. Thus, the segment liquid crystal cell 21 is suitable for the fine adjustment of the aberration because the aberration can be adjusted or corrected finely.

Referring to FIG. 1 again, an RF read-out signal detected in the photodetector 17 is supplied to a signal processing circuit 41. The signal processing circuit 41 generates a signal required for controlling the aberration correction unit 20 from the received RF signal. For example, the signal processing circuit 41 generates an amplitude envelope signal of the RF signal to send the signal to a controller 43. Moreover, the signal processing circuit 41 generates a detection signal indicating a type and number of layers of the loaded optical disc from the received RF signal to send the detection signal to the controller 43.

The controller 43 determines the aberration of the light beam on the basis of a signal such as the RF amplitude (envelope) signal or the detection signal received from the signal processing circuit 41, and/or according to a predetermined procedure. Furthermore, the controller 43, as described later, determines an applied voltage to the segment electrodes Ei of the segment liquid crystal cell 21, and an applied voltage to the hologram liquid crystal cell 31 based on the aberration of the light beam or a signal such as the detection signal. The controller 43 supplies each control signal indicating the applied voltage to a liquid driver circuit 45. The liquid driver circuit 45 generates the applied voltage to the segment liquid crystal cell 21 and the hologram liquid crystal cell 31 according to the control signal, and supplies the voltage to the aberration correction unit 20.

Figure 4:
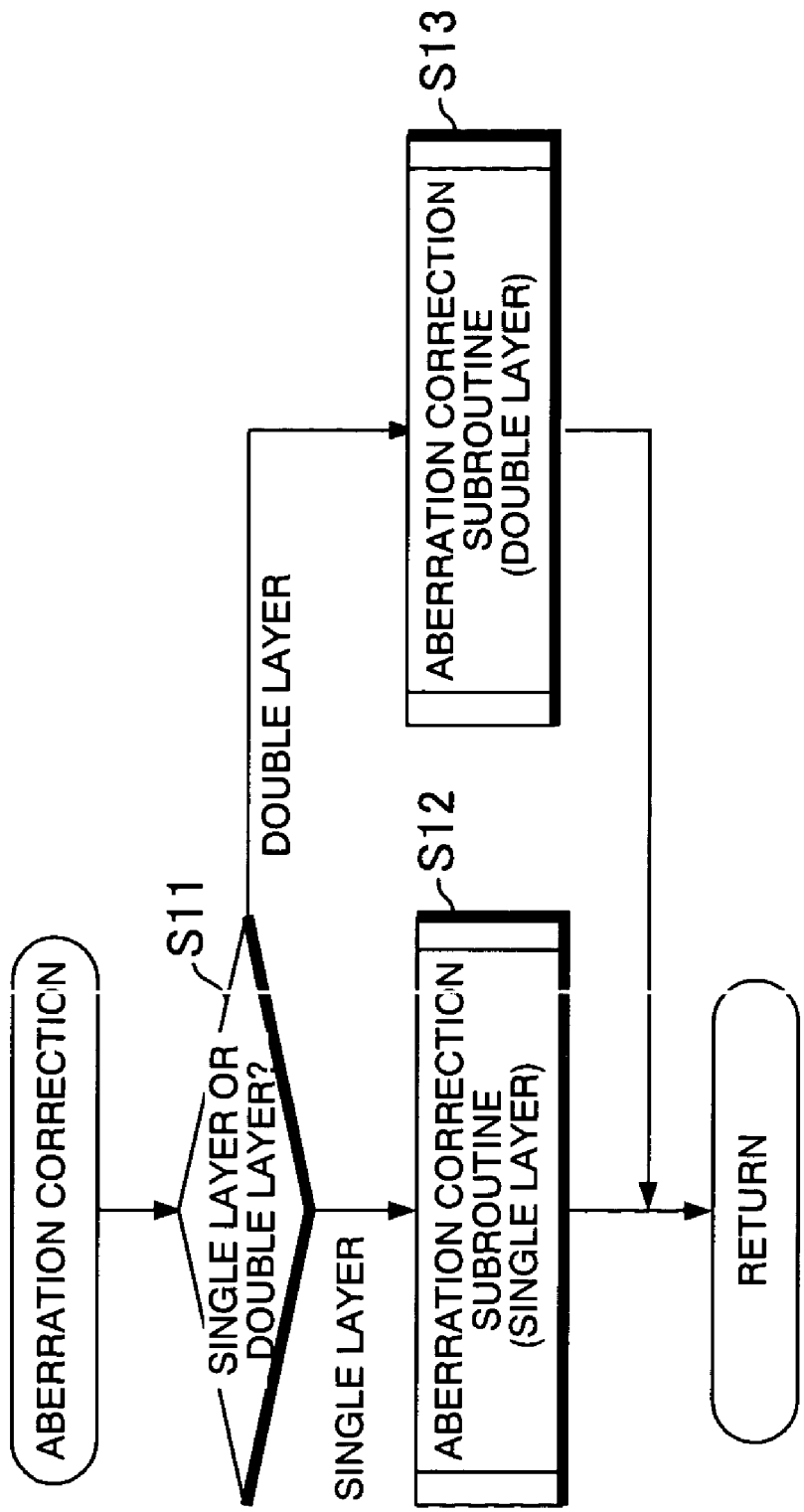
FIG. 4 is a flowchart showing a procedure of the aberration correction of the aberration correction apparatus according to the first embodiment of the present invention.

The aberration correction in the embodiment will be described in detail with reference to drawings. FIG. 4 is a flowchart showing a procedure of the aberration correction. Hereinafter, aberration correction by an aberration correction apparatus in a recording/reproduction apparatus for the single-layer disc and a double-layer disc is described.

It is discriminated whether a loaded disc is single-layer disc or not (step S11). When the loaded disc is discriminated to be a single-layer disc, the procedure proceeds to an aberration correction subroutine for the single-layer disc (step S12). When the loaded disc is discriminated to be a double-layer disc, the procedure proceeds to an aberration correction subroutine for the double-layer disc (step S13). That is, the aberration correction apparatus of the embodiment is a compatible aberration correction apparatus for the single-layer disc and double-layer disc.

Figure 5:
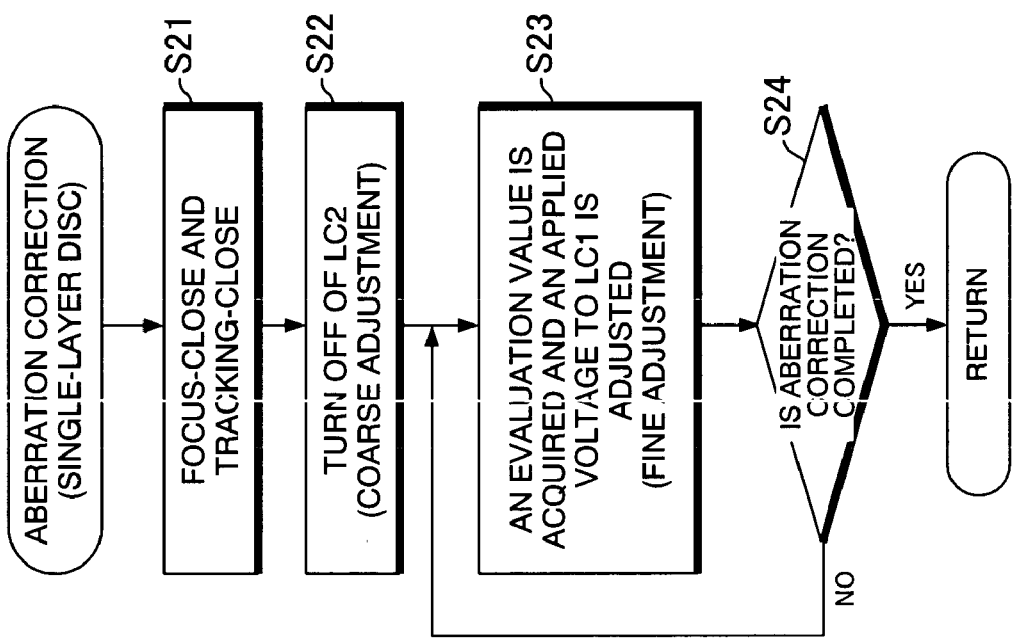
FIG. 5 is a flowchart showing a procedure of an aberration correction subroutine for the single-layer disc.

The procedure for an aberration correction subroutine for the single-layer disc will be described with reference to FIG. 5.

Figure 6:
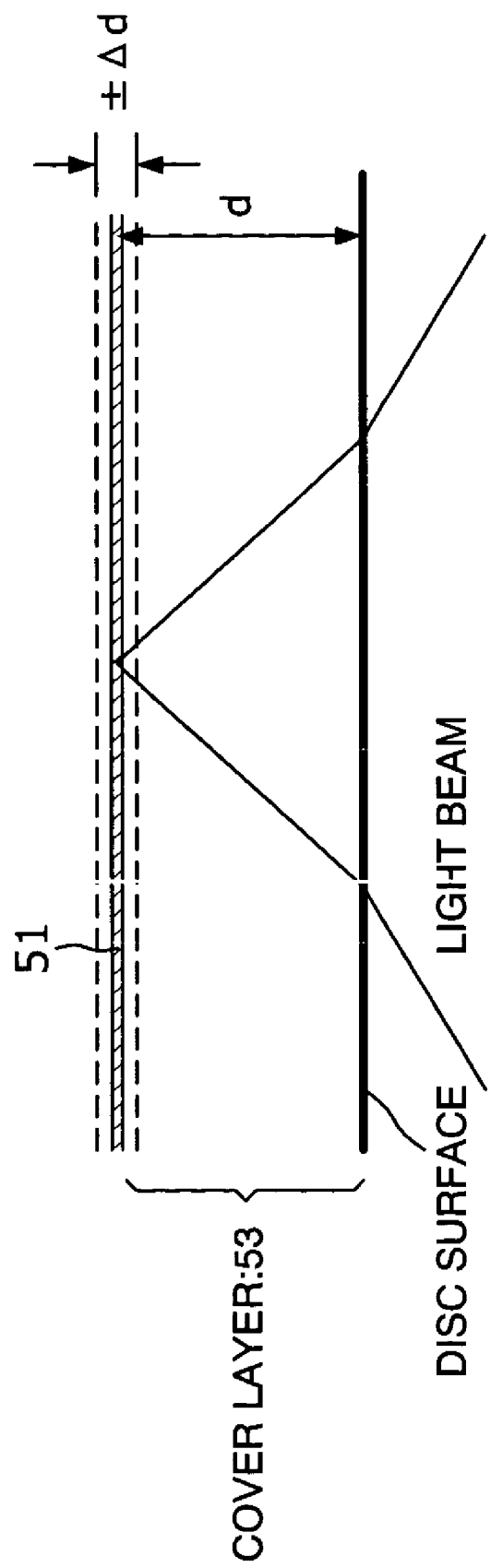
FIG. 6 is a schematic section view of the optical disc for illustrating a coarse adjustment and fine adjustment of the aberration correction for a recording layer of the single-layer disc.
Figure 7:
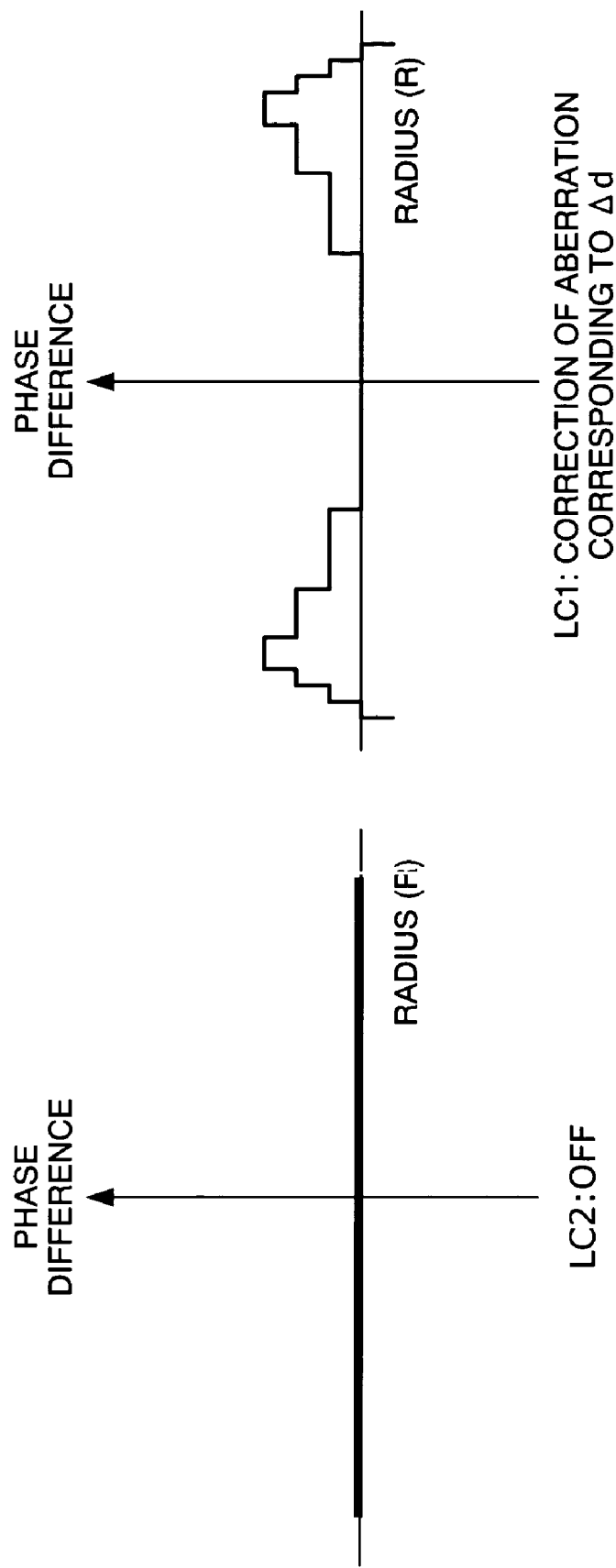
FIG. 7 is a view schematically showing a phase change caused to transmitted light by the segment liquid crystal cell (LC1) and hologram liquid crystal cell (LC2) in a case for the single-layer disc.

The controller 43 turns off the LC2 (hologram liquid crystal cell 31) for the coarse adjustment of the aberration correction (step S22) after focus-close and tracking-close to the recording layer for recording or reproduction has been completed (step S21). In other words, no voltage is applied to the LC2 so that the LC2 does not act as a hologram lens. A schematic sectional view of the single-layer optical disc shown in FIG. 6 and a view schematically showing a radial phase change of the light beam caused by the liquid crystal cell shown in FIG. 7 are referred. As shown in FIG. 6 and FIG. 7, an initial setting of an optical system is predeterminedly fixed to a condition that the coarse adjustment of the aberration correction has been performed for a recording layer 51 of a single-layer optical disc having a cover layer 53 (reference thickness: d).

Then, the controller 43 acquires an evaluation value corresponding to aberration of the light beam on the basis of the signal supplied from the signal processing circuit 41. For example, the signal processing circuit 41 detects the RF amplitude or envelope signal of the RF read-out signal for supply to the controller 43 as an evaluation characteristic. As the evaluation characteristic, various characteristics which are changed according to the aberration of the light beam such as bit error rate or jitter characteristic can be used.

The controller 43 acquires the evaluation value and adjusts the applied voltage to the LC1 (segment liquid crystal cell 21) such that the evaluation value becomes best (step 23). More specifically, for example, the RF amplitude is used as the evaluation value, and a level of the applied voltage to the segment electrodes Ei of the LC1 is adjusted such that the RF amplitude becomes a maximum value. Such adjustment is performed by repeating the acquisition of the evaluation value while changing the applied voltage. The operation provides the fine adjustment of the aberration correction.

In other words, as shown in FIG. 6 and FIG. 7, an aberration correction (or fine adjustment) for a spherical aberration corresponding to a thickness error $\pm\Delta d$ of the cover layer 53 (reference thickness: d) is performed.

Then, it is discriminated whether the aberration correction is completed or not, for example, in response to termination of the recording or reproduction (step S24). When it is discriminated that the aberration correction is not completed, the routine is returned to step S23, and the above-described procedure is repeated. The above-described adjustment is carried out while performing the recording or reproduction of the disc. On the other hand, when it is discriminated in the step S24 that the aberration correction is completed, the routine is completed.

Figure 8:
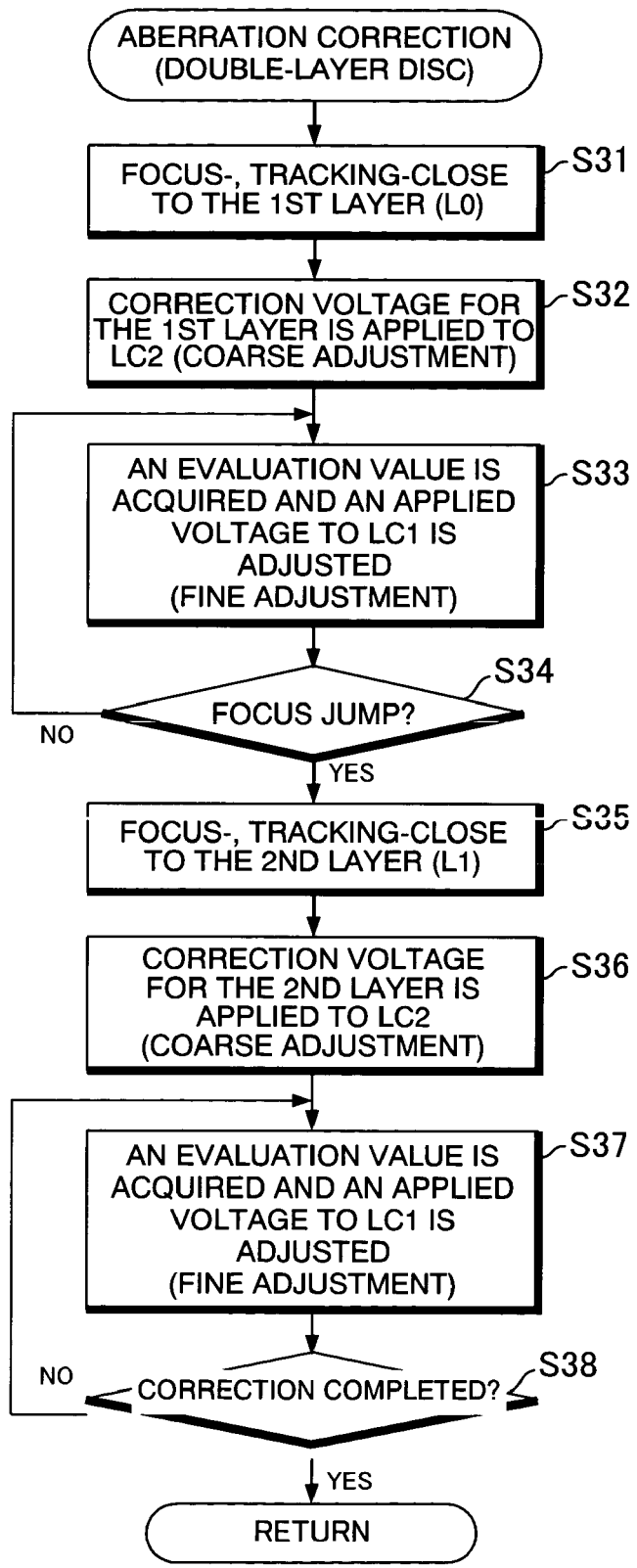
FIG. 8 is a flowchart showing a procedure of an aberration correction subroutine for a double-layer disc.
Figure 9:
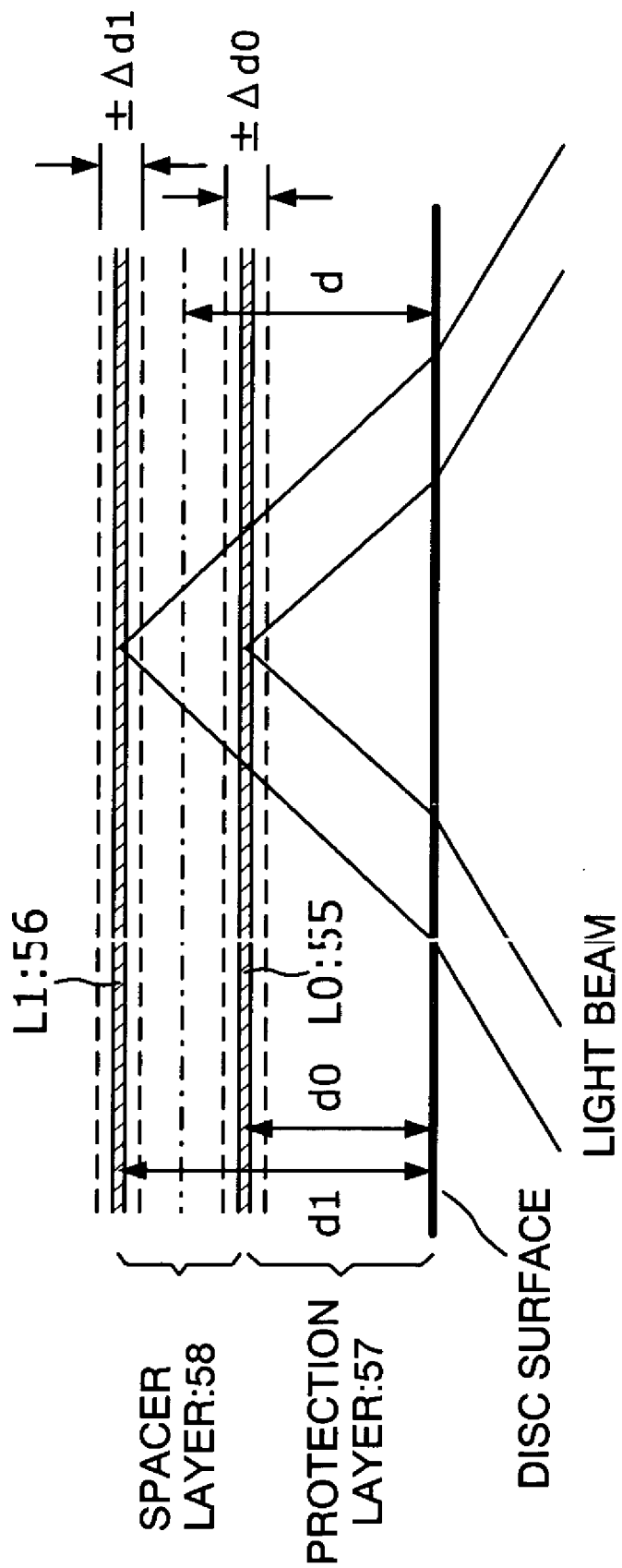
FIG. 9 is a schematic section view of the optical disc for illustrating the coarse adjustment and fine adjustment of the aberration correction for a recording layer of the double-layer disc.

Regarding a case where the disc is a double-layer disc, the procedure will be described in detail with reference to a flowchart of an aberration correction subroutine for the double-layer disc in FIG. 8. FIG. 9 is a cross sectional view schematically illustrating a structure of the double-layer disc. Hereinafter, the aberration correction for a double-layer disc is described as an example. In the example, the aberration correction is performed for a first recording layer (L0) 55, then a focus jump (interlayer jump) is done to a second recording layer (L1) 56, and the aberration correction is performed for the second recording layer (L1) 56.

First, after the focus-close and tracking-close (step S31) to the recording layer (L0) for recording or reproduction are completed, the controller 43 applies a correction voltage for the first recording layer to the LC2 (hologram liquid crystal cell 31) for the coarse adjustment of the aberration correction (step S32) thereby the coarse adjustment of the aberration correction for the first recording layer (L0) 55 is performed.

Figure 10:
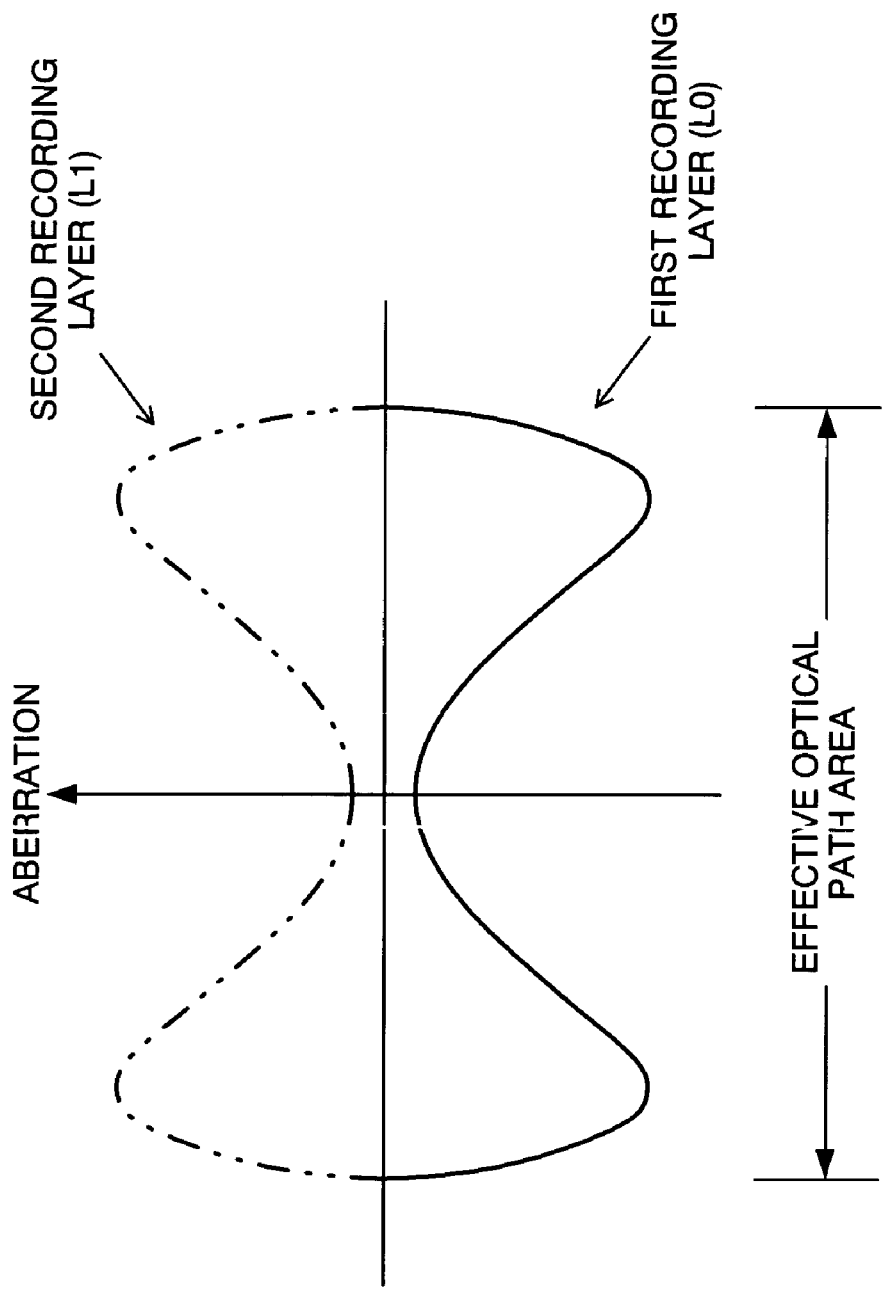
FIG. 10 is a view showing distribution of the spherical aberration caused by the optical disc in a plane perpendicular to a light axis against a first recording layer (solid line) and a second recording layer (broken line) in the recording or reproduction of the double-layer disc.

In this regard, the spherical aberration caused by the respective recording layers of the double-layer disc will be described in detail. FIG. 10 shows distribution of the spherical aberration, which is a main aberration among any aberration caused by the optical disc, in a plane perpendicular to the light axis for the first recording layer (solid line) and the second recording layer (broken line) in a case where recording or reproduction is performed to/from the double-layer disc. When the light beam is incident on the first recording layer, or in a case of a thin cover layer (thickness of protection layer 57: d0), the aberration decreases with increase in radius from center to the outer region of an optical path except for the most outer area (inverted M-shape). On the other hand, when the light beam is incident on the second recording layer, or in a case of a thick cover layer (or in a case of the second recording layer, total thickness d1 of the protection layer 57 and a spacer layer 58 is referred to as cover-layer), the aberration is small in the center of the optical path and increases with increase in radius from center to the outer region except for the most outer area (M-shape).

Therefore, the LC2 performs the aberration correction for the first recording layer of the double-layer disc having a cover layer with a smaller thickness (thickness of the cover layer: d0) than the reference cover thickness (d) of the recording layer of the single-layer disc only for an extent corresponding to the difference (d−d0>0) of the thickness of the cover layers, thereby the coarse adjustment is performed. In other words, the correction voltage for the first recording layer is determined such that the aberration correction corresponds to the difference of the thickness of the cover layers.

The phase of the light transmitted through the hologram liquid crystal cell 31 is changed according to the blaze pattern of the hologram liquid crystal cell 31. The hologram liquid crystal cell 31 serves as a hologram lens when a phase step in phase difference generated in the transmitted light is an integral multiple of wavelength of an incident light. However, the phase step is not an integral multiple of the wavelength of the incident light, diffraction efficiency is reduced, which in turn leads to reduction of the effectiveness as a hologram lens. Therefore, the applied voltage to the hologram liquid crystal cell 31 is determined such that the phase difference step generated in the transmitted light is an integral multiple of the wavelength of the incident light such that the wave front of the transmitted light is smoothly continuous.

After the coarse adjustment of the aberration correction has been completed for the first recording layer (L0) 55 in the step 32, the controller 43 acquires the evaluation value and adjusts the applied voltage to the LC1 (segment liquid crystal cell 21) so that the evaluation value becomes best (step S33). More specifically, for example, the level of the applied voltage to the segment electrodes Ei of the LC1 is adjusted such that the RF amplitude is maximum. Such adjustment is performed by repeating the acquisition of the evaluation value while changing the applied voltage. The operation provides the fine adjustment of the aberration correction.

Figure 11:
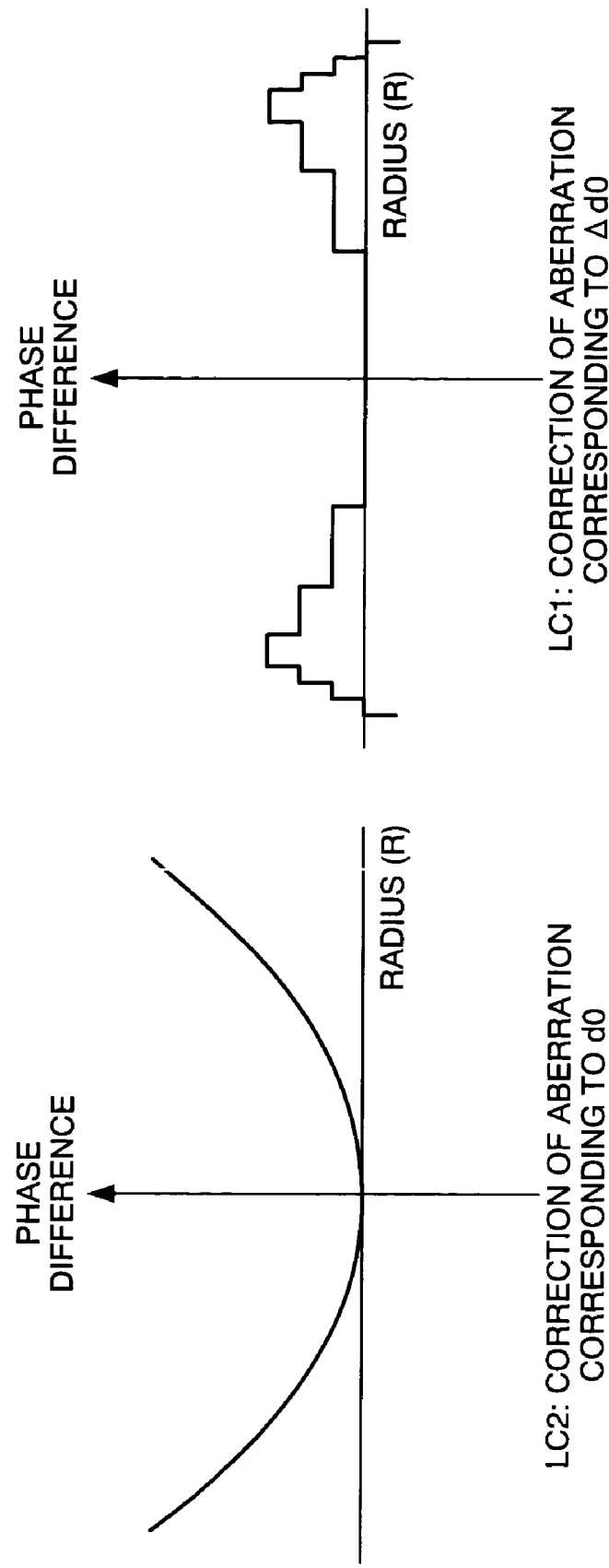
FIG. 11 is a view schematically showing a phase change caused by the segment liquid crystal cell (LC1) and hologram liquid crystal cell (LC2), regarding the first recording layer of the double-layer disc.

In other words, as shown in FIG. 9 and FIG. 11, an aberration correction (or fine adjustment) for a spherical aberration corresponding to a thickness error $\pm\Delta d0$ of the thickness (cover layer thickness) d0 of the protection layer 57 is performed.

Then, whether the focus jump from the first recording layer (L0) 55 to the second recording layer (L1) 56 is performed or not is discriminated (step S34). When it is discriminated that the focus jump is not performed, control is returned to step S33, and the above-described procedure is repeated.

On the other hand, when it is discriminated in the step S34 that the focus jump is performed, the focus-close and tracking-close are done to the second recording layer (L1) 56 (step S35). After the focus-close and tracking-close has been completed, the coarse adjustment of the aberration correction for the second recording layer (L1) 56 is performed by applying a correction voltage for the second recording layer to the LC2 (hologram liquid crystal cell 31) for the coarse adjustment of the aberration correction (step S36).

In this case, the LC2 performs the aberration correction only for an extent corresponding to the difference of thickness to the reference thickness (d) of the cover layer of the single-layer disc (d−d1<0), thereby the coarse adjustment is performed. That is, as shown in FIG. 12, the correction voltage for the second recording layer is determined such that a reverse phase difference to the phase difference in the above first recording layer is given.

After the coarse adjustment of the aberration correction has been completed for the second recording layer (L1) 56 in the step 36, the controller 43 acquires the evaluation value and adjusts the applied voltage to the LC1 (segment liquid crystal cell 21) such that the evaluation value is best (step S37). More specifically, for example, the level of the applied voltage to the segment electrodes Ei of the LC1 is adjusted such that the RF amplitude is maximum. Such adjustment is performed by repeating the acquisition of the evaluation value and the change of the applied voltage. The operation provides the fine adjustment of the aberration correction.

Figure 12:
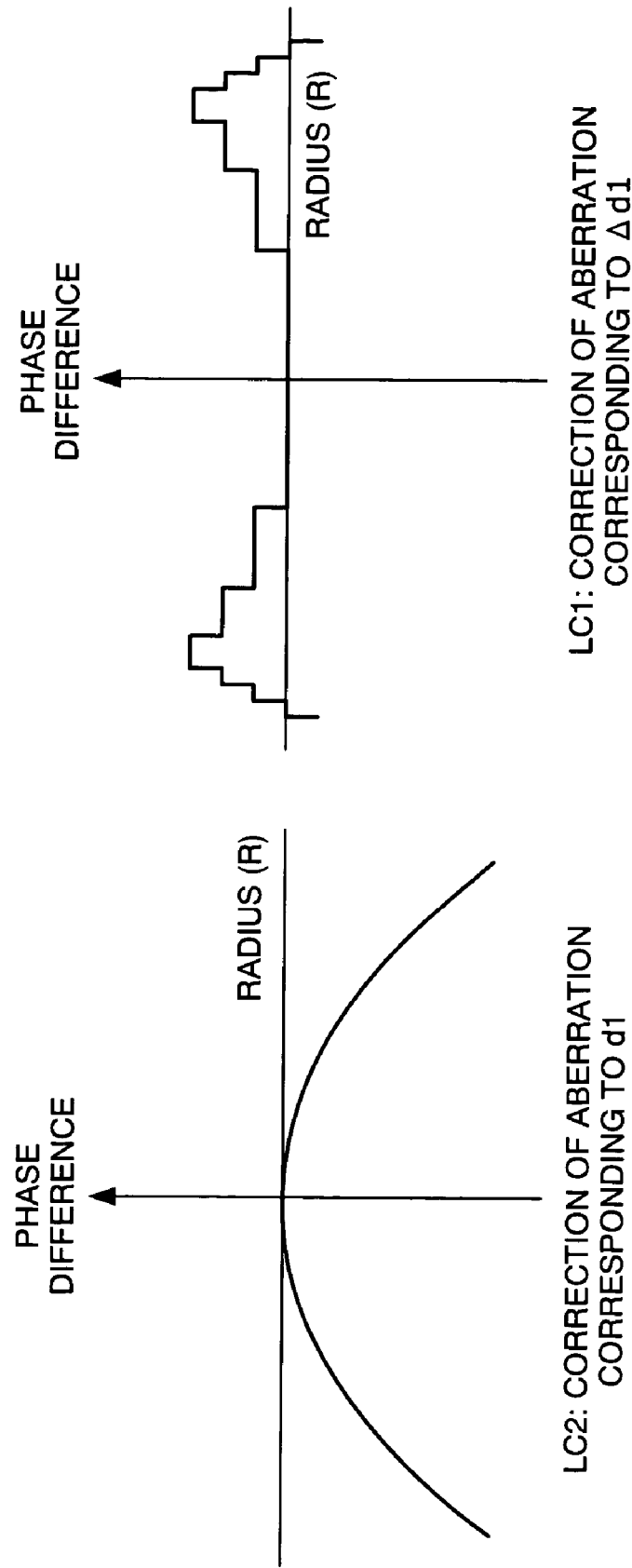
FIG. 12 is a view schematically showing a phase change caused by the segment liquid crystal cell (LC1) and the hologram liquid crystal cell (LC2), regarding the second recording layer of the double-layer disc.

In other words, as shown in FIG. 9 and FIG. 12, an aberration correction (or fine adjustment) for a spherical aberration corresponding to a thickness error $\pm\Delta d1$ of a total thickness of the protection layer 57 and the spacer layer 58 (or cover layer thickness: d1) is performed.

Then, whether the aberration correction is completed or not is discriminated (step S38). When the aberration correction is not completed, procedure control is returned to step S37, and the above procedure is repeated. On the other hand, when it is discriminated in the step S38 that the aberration correction is completed, the subroutine is completed.

As described above, a high-performance aberration correction apparatus can be realized. The apparatus has a capability of correcting the aberration of the light beam extensively for the single-layer disc and the double-layer disc and have compatibility for the discs. Moreover, a high-performance aberration correction apparatus, which is small, thin and fast-response, can be realized. Also, the apparatus is easily fabricated.

Although a case where the focus jump (interlayer jump) is performed from the first recording layer (L0) 55 to the second recording layer (L1) 56, and the aberration correction is carried out for the first recording layer (L0) 55 and the second recording layer (L1) 56 was described in the embodiments, even when the focus jump is performed from the second recording layer (L1) 56 to the first recording layer (L0) 55, the apparatus is also usable. Furthermore, it is not limited to a case where the focus jump is performed. That is, a case where the recording or reproduction is performed only to either one of the first recording layer and the second recording layer may be included.

The controller 43 may have a means for discriminating which recording layer is currently focused between the first recording layer (L0) 55 and the second recording layer (L1) 56. For example, whether a current recording layer is the first recording layer or the second recording layer is discriminated using a signal according to the aberration of the light beam from the signal processing circuit 41, and the applied voltage to the liquid crystal cell for the coarse adjustment (hologram liquid crystal cell 31) and the liquid crystal cell for the fine adjustment (segment liquid crystal cell 21) may be determined based on the discrimination result.

Although a compatible aberration correction apparatus for the single-layer disc and the double-layer disc was described as an example in the embodiment, the apparatus can be easily extended to a compatible aberration correction apparatus for a multi-layer disc having three recording layers or more. For example, the apparatus is adapted to the multi-layer disc by providing steps for the coarse adjustment of the hologram liquid crystal cell for the number corresponding to the number of the recording layers. Alternatively, multiple hologram liquid crystal cells may be provided corresponding to the number of the recording layers.

Although the compatible aberration correction apparatus was described as the example, the aberration correction apparatus may be an apparatus used only for the single-layer disc, the double-layer disc, or the multi-layer disc having a predetermined number of recording layers.

Second Embodiment

Figure 13:
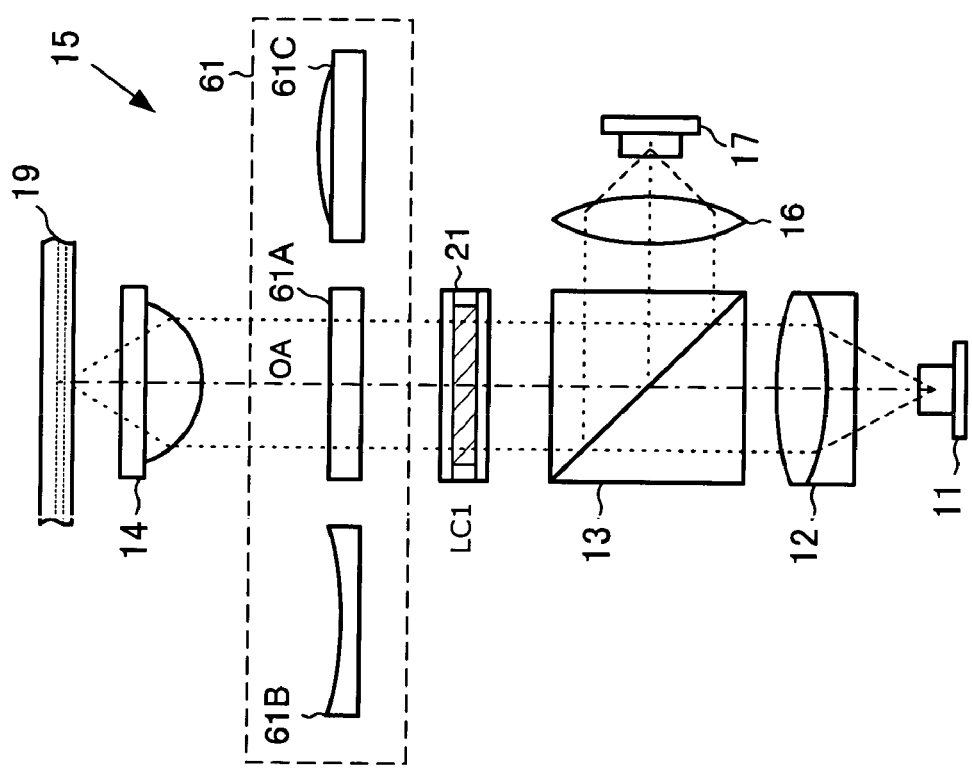
FIG. 13 is a block diagram showing a configuration of an optical pickup in the aberration correction apparatus according to a second embodiment of the invention.

FIG. 13 is a block diagram showing a configuration of an optical pickup 15 in the aberration correction apparatus 10 according to a second embodiment of the present invention. In the embodiment, an optical unit 61 for the coarse adjustment of the aberration correction is used instead of the hologram liquid crystal cell 31 in the above-described first embodiment.

More specifically, the optical unit 61 comprises a glass plate 61A, a concave lens 61B, and a convex lens 61C. The glass plate 61A, the concave lens 61B, and the convex lens 61C are mounted on an actuator (not shown), and driven by the control signal from the controller 43, and either one of the lenses is switched to be arranged on the light axis (OA).

An aberration correction operation in the embodiment is described below. In the aberration correction for the single-layer disc, as the first embodiment, after the focus-close and tracking-close to the recording layer has been completed, the glass plate 61A for the coarse adjustment of the aberration correction is selected and arranged on the light axis (OA).

Then, the controller 43 acquires the evaluation value corresponding to the aberration of the light beam from the signal processing circuit 41 and adjusts the applied voltage to the LC1 (segment liquid crystal cell 21) such that the evaluation value is best. The fine adjustment of the aberration correction is performed by repeating such acquirement of the evaluation value while changing the applied voltage.

In the aberration correction for the double-layer disc, when the aberration correction is performed for the first recording layer (L0) 55, for example, the concave lens 61B is selected and arranged on the light axis (OA). This allows the coarse adjustment of the aberration correction according to the distance between the recording layers. Then, the fine adjustment of the aberration correction is performed by adjusting the applied voltage to the LC1 (segment liquid crystal cell 21) such that the evaluation value corresponding to the magnitude of the aberration is best.

When the aberration correction is performed for the second recording layer (L1) 56, for example, the convex lens 61C is selected and arranged on the light axis (OA). This allows the coarse adjustment of the aberration correction according to the distance between the recording layers. A point that the fine adjustment of the aberration correction is performed by adjusting the applied voltage to the LC1 (segment liquid crystal cell 21) such that the evaluation value corresponding to the magnitude of the aberration is best is same as in the above-described embodiment.

As described hereinbefore, a high-performance aberration correction apparatus can be realized in which the aberration of the light beam can extensively be corrected.

The aberration correction apparatus is having a segment liquid-crystal aberration correction element comprising multiple aberration correction portions that cause a phase change upon application of voltage to the segment electrodes, and a hologram aberration correction element that gives a phase change where the wave front has a blaze hologram pattern to the transmitted light upon application of voltage, performing the coarse adjustment of the aberration correction by driving the hologram aberration correction element based on the magnitude of the aberration of the reflected light, and finely correcting the aberration remained after the coarse adjustment of the aberration correction by adjusting the applied voltage to the segment liquid-crystal aberration correction element.

Therefore, a high-performance aberration correction apparatus, which can extensively correct the aberration of the light beam, can be realized. Moreover, a high-performance aberration correction apparatus, which is able to correct the aberration caused by the multi-layer disc, in addition, adapted to the single-layer disc can be realized.

Moreover, since a thin liquid crystal element can extensively correct the aberration, a fast-response and high-performance aberration correction apparatus can be obtained. Furthermore, the apparatus has various advantages such as ease in fabrication and compactness.

The aberration correction apparatus can be broadly applied to various optical systems, not to limited to the pickup device for the optical disc.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on Japanese Patent Application No.2002-260119 which is hereby incorporated by reference.

What is claimed is:

1. An aberration correction apparatus for correcting aberration generated by reflection of a light beam reflected from a recording layer of a recording medium which is irradiated with the light beam, comprising:
    a first aberration correction element having a plurality of aberration correction portions and causing a phase change in a transmitting light beam upon application of voltage,
    a second aberration correction element which causes a phase change in a transmitting light beam such that the wave front of the transmitted light beam has a blaze hologram shape,
    a discriminator which receives the reflected light beam to discriminate the aberration of the reflected light beam,
    a coarse phase adjuster which drives the second aberration correction element on the basis of the magnitude of the aberration of the reflected light beam to perform an aberration correction, and
    a fine phase adjuster which adjusts the applied voltage to the aberration correction portions of the first aberration correction element to correct aberration remained after the aberration correction by the coarse phase adjuster.

2. The aberration correction apparatus according to claim 1, wherein the recording medium has a plurality of recording layers, and the coarse phase adjuster drives the second aberration correction element on the basis of the magnitude of the aberration of the reflected light beam when a light beam irradiation position is changed from one recording layer to other recording layer in the recording medium.

3. The aberration correction apparatus according to claim 1, wherein the second aberration correction element has a hologram liquid crystal encapsulated in a blaze hologram shape, and an electrode for changing a magnitude of the phase change caused to the transmitted light beam upon application of voltage,
    and the coarse phase adjuster drives the second aberration correction element such that wave front of the light beam is continuous after the light beam has transmitted through the second aberration correction element.

4. The aberration correction apparatus according to claim 1, wherein the first aberration correction element comprises a first electrode including a plurality of transparent segment electrodes arranged corresponding to the plurality of aberration correction portions, a second electrode opposed to the first electrode, and liquid crystal which causes a phase change to the transmitted light beam upon application of voltage to the first and second electrodes.

5. An aberration correction apparatus for correcting aberration generated by reflection of a light beam reflected from a recording layer of a recording medium which is irradiated with the light beam, comprising:
    a first aberration correction element having a plurality of aberration correction portions and causing a phase change in a transmitting light beam upon application of voltage,
    a second aberration correction element including at least one lens,
    an actuator which drives the second aberration correction element,
    a discriminator which receives the reflected light beam to discriminate the aberration of the reflected light beam,
    a coarse phase adjuster which selects one of the at least one lens on the basis of the magnitude of the aberration of the reflected light beam, and drives the actuator to move the selected lens on a light axis of the reflected light beam to perform aberration correction,
    and a fine phase adjuster which adjusts the applied voltage to the aberration correction portions of the first aberration correction element to correct aberration remained after the aberration correction by the coarse phase adjuster.

6. The aberration correction apparatus according to claim 5, wherein the second aberration correction element includes a concave lens and a convex lens.

* * * * *